(12) United States Patent
Johnson et al.

(10) Patent No.: US 7,693,618 B2
(45) Date of Patent: Apr. 6, 2010

(54) SYSTEM FOR MONITORING RNP FOR SAFE TERRAIN CLEARANCE

(75) Inventors: Steve C. Johnson, Issaquah, WA (US); Yasuo Ishihara, Kirkland, WA (US)

(73) Assignee: Honeywell International Inc., Morristown, NJ (US)

( * ) Notice: Subject to any disclaimer, the term of this patent is extended or adjusted under 35 U.S.C. 154(b) by 915 days.

(21) Appl. No.: 11/383,532

(22) Filed: May 16, 2006

(65) Prior Publication Data
US 2010/0010694 A1    Jan. 14, 2010

(51) Int. Cl.
*G08G 5/00*    (2006.01)
(52) U.S. Cl. .................... 701/8; 701/9; 340/970
(58) Field of Classification Search .................... None
See application file for complete search history.

(56) References Cited

U.S. PATENT DOCUMENTS

| | | | |
|---|---|---|---|
| 4,567,483 A * | 1/1986 | Bateman et al. | 340/970 |
| 5,839,080 A | 11/1998 | Muller et al. | |
| 7,477,164 B1 * | 1/2009 | Barber | 340/945 |
| 2002/0097169 A1 * | 7/2002 | Johnson et al. | 340/970 |
| 2003/0016145 A1 * | 1/2003 | Bateman | 340/967 |
| 2003/0036828 A1 * | 2/2003 | Conner et al. | 701/9 |
| 2003/0093193 A1 | 5/2003 | Pippenger | |
| 2004/0160341 A1 | 8/2004 | Feyereisen et al. | |
| 2005/0057376 A1 * | 3/2005 | Naimer et al. | 340/973 |
| 2006/0253232 A1 * | 11/2006 | Gerrity et al. | 701/16 |

FOREIGN PATENT DOCUMENTS

WO    2004070677 A2    8/2004

\* cited by examiner

*Primary Examiner*—Michael J. Zanelli
(74) *Attorney, Agent, or Firm*—Black Lowe & Graham PLLC

(57) ABSTRACT

Systems and methods for monitoring Required Navigational Performance (RNP) Procedures and reducing nuisance Enhanced Ground Proximity Warning System warnings including a processor, a memory with RNP instructions and data, and a communication device. The processor accesses the RNP data and instructions from the memory, and uses the communication device to obtain flight information from a Flight Management System of an aircraft. When the processor determines that the aircraft is in RNP space, the processor projects an RNP envelope and modifies a warning envelope of an EGPWS to coincide with the RNP envelope if the EGPWS warning envelope extends farther than the RNP envelope.

19 Claims, 4 Drawing Sheets

SYSTEM FOR MONITORING RNP FOR SAFE TERRAIN CLEARANCE

BACKGROUND OF THE INVENTION

At present, many aircraft are equipped with Enhanced Ground Proximity Warning Systems (EGPWS), such as the system taught in U.S. Pat. No. 5,839,080, titled "Terrain Awareness System," issued Nov. 17, 1998 to Muller et al., and herein incorporated by reference. The EGPWS combines a worldwide digital terrain database with a long-range navigation system such as Global Positioning System, INS (Inertial Navigation System), radio-dependant navigational systems, or a combination of the above. On-board computers can compare its current location with a database of the Earth's terrain. Pilots receive timely cautions and warnings of any obstructions to the aircraft's path. The EGPWS uses the intended flight path and projects a volume (or envelope) around the flight path. The volume is determined by the flight path, the aircraft capabilities, and a "buffer" zone of safety to allow for human and mechanical errors. If the projected volume intersects with terrain features or other obstacles, the EGPWS notifies the pilot.

Required Navigational Performance (RNP) is a statement of the navigation performance accuracy necessary for operation within a defined airspace. RNP extends the capabilities of modern airplane navigation systems by providing real-time estimates of navigation uncertainty, assurance of performance through its containment concepts, and features that ensure the repeatability and predictability of airplane navigation. This precise characterization of airplane performance is key to designing more efficient airspace routes and procedures. Additional information may be found in Federal Aviation Administration (FAA) Order 8400.33, Procedures for Obtaining Authorization for RNP-4 Oceanic and Remote Area Operations, and FAA Notice N 8000 RNP-SAAAR, Airworthiness and Operational Approval for Special Required Navigation Performance (RNP) Procedures with Special Aircraft and Aircrew Authorization Required (SAAAR).

RNP allows smaller, more precise flight paths than current practices, and thus may help increase the amount of air traffic allowable in an area at any given time. RNP flight paths (or RNP envelopes) are not aircraft-dependent, and are fixed in space, as opposed to the EGPWS envelopes, which are based from the aircraft. This may cause the EGPWS to trigger terrain avoidance alerts (caution or warning) because terrain or other obstacles impinges on the EGPWS alert envelope. The RNP envelope, being smaller than the EGPWS envelope, may not be impinged by the obstacle and thus, even though a terrain avoidance alert has been signaled, the aircraft may not be in a dangerous situation. In such a situation the EGPWS alert is considered a "nuisance" alert. These nuisance alerts may reduce pilot responsiveness to the EGPWS alerts; that is, the pilot may start to ignore the EGPWS alert. Additionally, the approach path designer must tailor the approach to avoid ground proximity alarms which leads to non-optimum approach paths, and sometimes the alarm conditions may not be avoidable at all.

What is needed are systems and methods of reducing the number of nuisance alerts received by a pilot.

BRIEF SUMMARY OF THE INVENTION

Systems and methods of monitoring RNP and providing safe terrain clearance are provided. In one aspect, a system including a computer-readable memory containing RNP data, a processor, and a communication device is provided. The processor uses the communication device to communicate with an aircraft EGPWS, Flight Management System, data sensors, and terrain and obstacle database. The processor ascertains a location of the aircraft, and determines whether the aircraft is in RNP space. If the aircraft is in RNP space, the processor accesses RNP information from the memory. The processor uses the RNP information to determine an RNP envelope, and checks to see if the EGPWS warning (or caution) envelope extends outside of the RNP envelope. If the EGPWS warning (or caution) envelope does extend outside the RNP envelope, the processor reduces the size of the EGPWS envelope to match the size of the RNP envelope.

In a different aspect, the RNP information is contained in the FMS, and the EGPWS is modified to access the RNP information and perform the methods of the present invention.

As will be readily appreciated from the foregoing summary, the invention provides systems and methods for monitoring RNP and reducing nuisance EGPWS warnings.

BRIEF DESCRIPTION OF THE SEVERAL VIEWS OF THE DRAWING

The preferred and alternative embodiments of the present invention are described in detail below with reference to the following drawings.

DETAILED DESCRIPTION OF THE INVENTION

Figure 1:
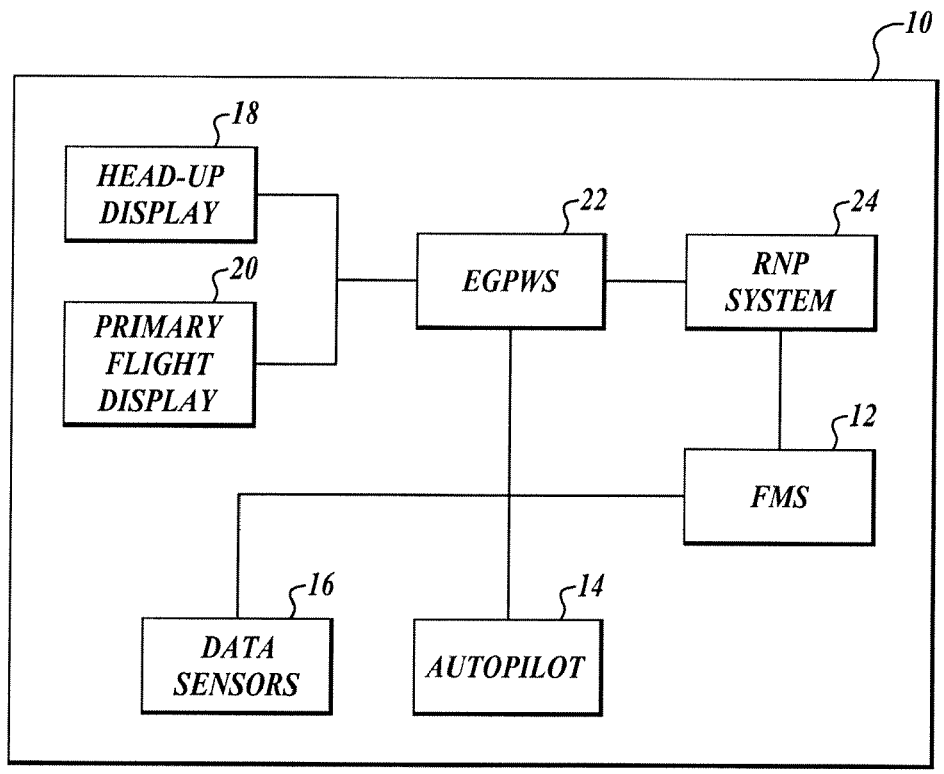
FIG. 1 is a block diagram of an aircraft equipped with an embodiment of the present invention.

FIG. 1 shows a schematic diagram of an aircraft 10 for performing an embodiment of the present invention. The aircraft 10 includes a Flight Management System (FMS) 12, an autopilot 14, data sensors, head-up and primary flight displays 18, 20, an Enhanced Ground Proximity Warning System (EGPWS) 22, and a Required Navigation Performance (RNP) procedure system 24 (referred to herein as the RNP system 24). The RNP system 24 is in communication with the aircraft EGPWS 22 and the FMS 12. Thusly, the RNP system 24 may access the EGPWS 22 and the FMS 12 to obtain the information and data necessary to perform methods according to the present invention.

Figure 2:
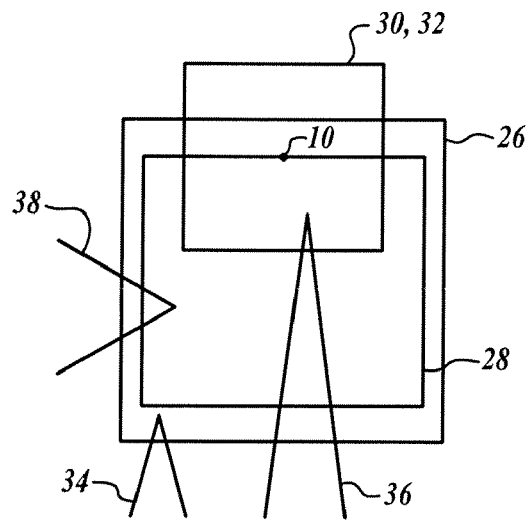
FIG. 2 is a front view of an aircraft using an embodiment of the present invention and an airspace around the aircraft.

FIG. 2 shows a front or rear view of an aircraft 10. The aircraft 10 is flying in RNP space. An EGPWS caution envelope 26 is unchanged, and an EGPWS warning envelope 28 size has been altered to conform to the size of the RNP flight envelope 32, thereby forming a modified EGPWS warning envelope 30. Thus, if the EGPWS 22 determines that stored information associated with terrain or an obstacle 34 impinges on the caution envelope 26, the EGPWS 22 transmits a caution to a pilot of the aircraft 10. Similarly, if the EGPWS 22 determines that stored information associated with terrain or an obstacle 36 impinges on the modified warning envelope 30, a warning is transmitted to the pilot. Thus, an obstacle 38 that impinges on the unmodified warning envelope 28 does not trigger a warning. In this way, nuisance warnings of obstacles 38 impinging on the unmodified warning envelope 28 but not the RNP flight envelope 32 (and modified warning envelope 30) are avoided. Unmodified warning envelope 28 is not present, but has been shown for clarity.

Figure 3:
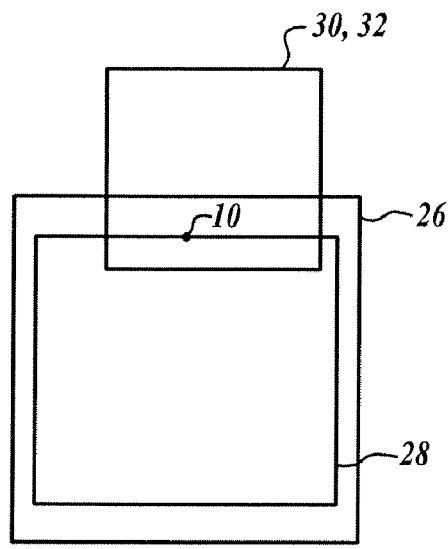
FIG. 3 is a front view of an aircraft using an embodiment of the present invention.

FIG. 3 shows a front or rearview of the aircraft 10 that is in RNP space and flying within the RNP flight envelope 32, but not centered in the RNP flight envelope 32. In this situation, the EGPWS caution envelope 26 is still projected from the location of the aircraft 10 and extends outside of the RNP flight envelope 32, but the modified warning envelope 30 is sized to conform to the size of the RNP flight envelope 32 or a portion of the flight envelope 32, which is not centered on the aircraft 10. The unmodified warning envelope 28 is not present, but has been shown for clarity.

Figure 4:
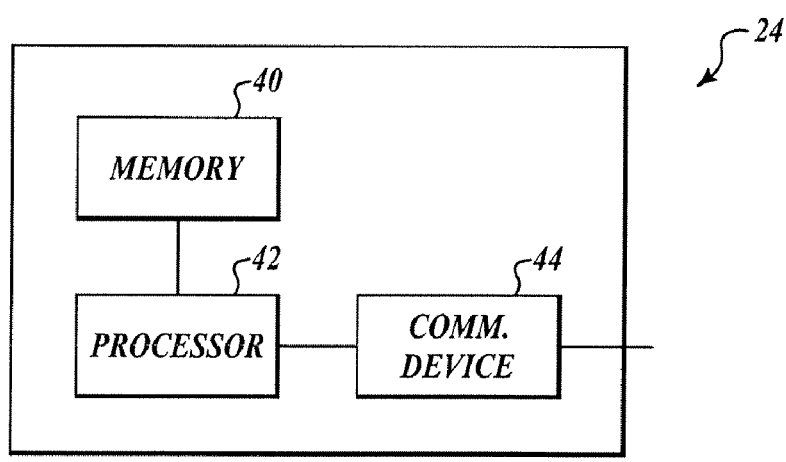
FIG. 4 is a block diagram of an embodiment of an RNP system.

FIG. 4 shows an embodiment of an RNP system 24 in accordance with the several principles of the present invention. The RNP system 24 includes a computer-readable memory 40 containing RNP data and instructions, a processor 42, and a communication device 44. The processor 42 uses the communication device 44 to access data from the other aircraft systems (not shown), and accesses RNP data and instructions contained in the memory 40. The communication device 44 may additionally use wireless communication to send information to and receive information from ground-based infrastructures. For example, the RNP system 24 may access information from Satellite Communication (SATCOM) stations through the communication device 44. The communication device 44 may use the Aircraft Communications Addressing and Reporting System (ACARS) to exchange information with sources external to the aircraft 10.

Figure 5:
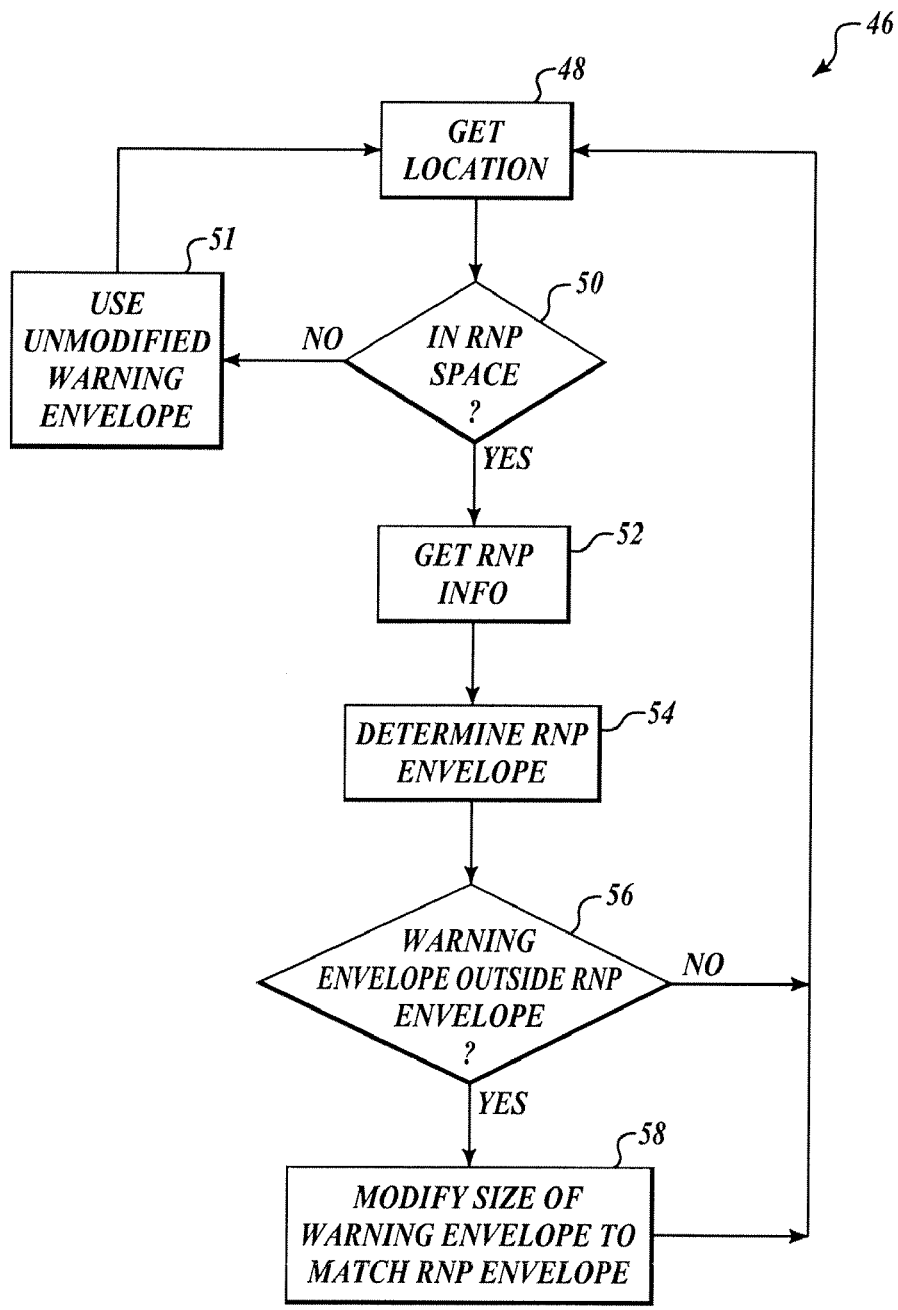
FIG. 5 is a flow chart of a method of the present invention.

FIG. 5 shows a flowchart of a method 46 formed according to the present invention. At a first block 48, the system 24 ascertains a location of the aircraft 10 by accessing the FMS 12. The system 24 then determines if the aircraft 10 is in RNP space at a block 50. If the aircraft 10 is not in RNP space, the system 24 continues to use (or switches to) the unmodified EGPWS warning envelope at a block 51, and returns to the first block 48. If the aircraft 10 is in RNP space, the system 24 accesses RNP information and instructions at a block 52, and uses the data and information to identify the RNP flight envelope 32 at a block 54. The system 24 then determines whether an EGPWS warning envelope 28 projects outside of the RNP flight envelope 32 at a block 56. If the EGPWS warning envelope 28 is not projected outside of the RNP flight envelope 32, the system 24 returns to the first block 48. If the EGPWS warning envelope 28 is outside of the RNP flight envelope 32, the system 24 instructs the EGPWS 22 to modify the size of the warning envelope 28 to fit the boundary of the RNP flight envelope 32. The system ht envelope 32 or a 24 then returns to the first block 48. Though the method 46 has been described using the EGPWS warning envelope 28 and modified EGPWS warning envelope, the method may also use the EGPWS caution envelope 26 and a modified EGPWS caution envelope.

Figure 6:
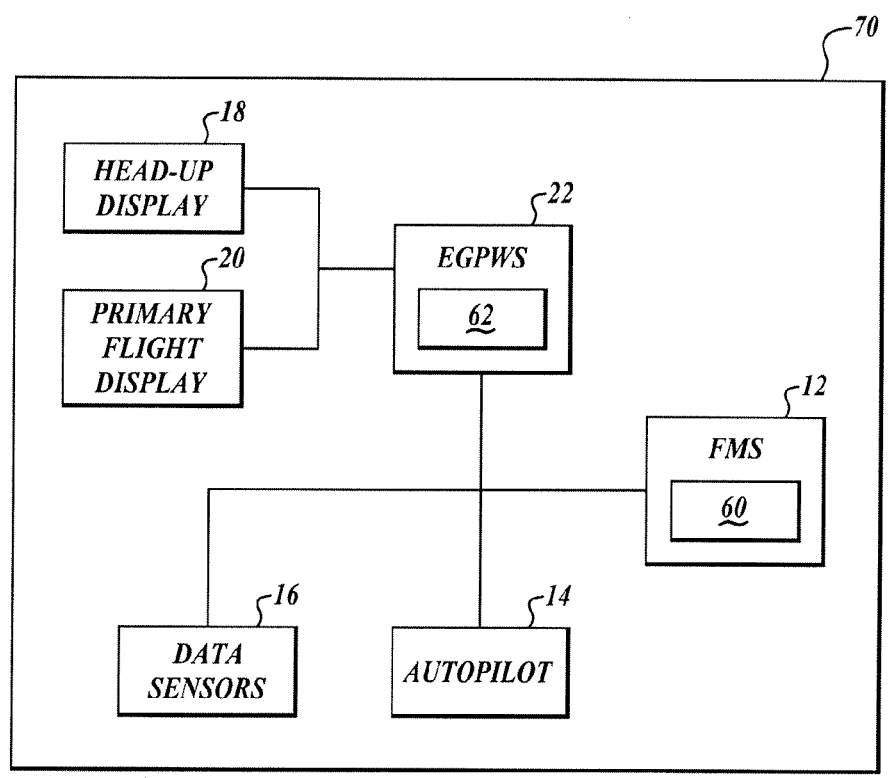
FIG. 6 is a block diagram of an airplane using an alternate embodiment of the present invention.

FIG. 6 shows a schematic diagram of an aircraft 70 with no RNP system. The aircraft 70 includes memory 60 in the FMS 12 and has been modified to contain instructions for performing the method 46 of FIG. 5. The aircraft 70 also includes an EGPWS processor 62 modified to access and perform the associated steps of the method 46. This embodiment may reduce the amount of time and effort needed to equip an aircraft with a system and method according to the several principles of the present invention.

While the preferred embodiment of the invention has been illustrated and described, as noted above, many changes can be made without departing from the spirit and scope of the invention. For example, the RNP device of FIG. 5 may include radio communication which allows it to communicate with radar and air traffic control stations to obtain the required data. Accordingly, the scope of the invention is not limited by the disclosure of the preferred embodiment. Instead, the invention should be determined entirely by reference to the claims that follow.

What is claimed is:

1. A method comprising:
   determining the location of an aircraft;
   determining whether the aircraft is governed by Required Navigation Performance (RNP) procedures;
   accessing RNP information if the aircraft is determined to be governed by RNP and determining an RNP envelope based on the accessed RNP information;
   determining whether a ground proximity envelope extends outside of the determined RNP envelope; and
   modifying the ground proximity envelope to match the determined RNP envelope if the envelope extends outside of the determined RNP envelope.

2. The method of claim 1, wherein determining the location of an aircraft includes accessing the aircraft location from a Flight Management System of the aircraft.

3. The method of claim 1, wherein determining the location of an aircraft includes accessing information about the location of the aircraft from a ground-based source by wireless communication.

4. The method of claim 1, wherein accessing RNP information includes accessing RNP information from a Flight Management System.

5. The method of claim 1, wherein accessing RNP information includes accessing RNP information from a source external to the aircraft by wireless communication.

6. The method of claim 5, wherein the external source is a Satellite Communication (SATCOM) station.

7. The method of claim 5, wherein the wireless communication includes using Aircraft Communications Addressing and Reporting System (ACARS).

8. The method of claim 1, wherein the ground proximity envelope is an Enhanced Ground Proximity Warning System envelope.

9. The method of claim 8, wherein the Enhanced Ground Proximity Warning System Envelope is at least one of a caution envelope and a warning envelope.

10. A device comprising:
   a computer-readable memory containing Required Navigation Performance (RNP) procedure information; and
   a processor including:
     a component for determining the location of an aircraft;
     a component for determining whether the aircraft is governed by RNP;
     a component for accessing RNP information if the aircraft is determined to be governed by RNP and determining an RNP envelope based on the accessed RNP information; and,
     a component for determining whether a ground proximity envelope extends outside of the determined RNP envelope and modifying the ground proximity envelope to match the determined RNP envelope if the envelope extends outside of the determined RNP envelope.

11. The device of claim 10, including a communication device configured to send and receive information from the processor, wherein the processor is further configured to send signals to a communication device.

12. The device of claim 11, wherein the communication device may send information to and receive information from a Flight Management System of an aircraft.

13. The device of claim 10, wherein the ground proximity envelope is an Enhanced Ground Proximity Warning System envelope.

14. The device of claim 13, wherein the Enhanced Ground Proximity Warning System envelope is one of a caution envelope and a warning envelope.

15. The device of claim 11, wherein the communication device may communicate wirelessly to send information to and receive information from a source on the ground.

16. An aircraft, comprising:
a ground proximity warning system;
a Flight Management System (FMS);
a computer-readable memory including Required Navigation Performance (RNP) procedure information;
a processor configured to access the RNP procedure information and to send signals to a communication device; and
a communication device configured to transmit information to and receive information from the ground proximity warning system and the FMS in response to the processor signals,
wherein in response to a ground proximity envelope extending outside of a determined RNP envelope during flight when the RNP procedure applies, a modified ground proximity envelope substantially fits a boundary of the determined RNP envelope.

17. The aircraft of claim 16, wherein the memory is contained in the FMS and the processor is contained in the ground proximity warning system.

18. The aircraft of claim 16, wherein the ground proximity warning system is an Enhanced Ground Proximity Warning System.

19. A method compromising:
determining if an aircraft is in a Required Navigation Performance (RNP) procedures environment; and
modifying ground proximity alerting if the aircraft is determined to be in the RNP procedures environment, wherein in response to a ground proximity envelope extending outside of a determined RNP envelope during flight in the RNP procedure environment, a modified ground proximity envelope substantially fits a boundary of the determined RNP envelope.

* * * * *